3,453,115
PREPARATION OF READY-TO-EAT PUFFED CEREAL
Adolph S. Clausi, Cos Cob, Conn., and Willard L. Vollink, Battle Creek, Mich., assignors to General Foods Corporation, White Plains, N.Y., a corporation of Delaware
No Drawing. Continuation-in-part of application Ser. No. 432,885, Feb. 15, 1965. This application Dec. 6, 1965, Ser. No. 511,967
Int. Cl. A23l 1/18
U.S. Cl. 99—81
2 Claims

ABSTRACT OF THE DISCLOSURE

A ready-to-eat puffed cereal is prepared by heating case hardened cereal pellets with a moisture content of 16–21 percent at temperatures in the range of 350° F. to 750° F. Heat is supplied by forced air circulation with an air velocity of at least 500 feet per minute.

---

This application is a continuation-in-part of now abandoned U.S. patent application Ser. No. 432,885 for "Food Product and Process."

The present invention relates to ready-to-eat cereals and, more particularly, to puffed ready-to-eat cereals.

Although it is known to puff rice in its natural grain form, it has not been possible heretofore to provide puffed products from other cereals such as corn, wheat, barley, oats, and the like, or combinations thereof.

It is, therefore, an object of the present invention to provide ready-to-eat puffed cereals. Another object is to provide a method for preparing puffed ready-to-eat cereals from cereals other than rice. These and other objects of the present invention will become apparent as the description proceeds.

It has now been found that ready-to-eat puffed cereals may be prepared by subjecting a cooked case-hardened cereal dough to elevated temperatures of at least 350° F. and high velocities of air at 500 feet per minute.

The cereal dough may be prepared from various cereals such as, for example, corn, wheat, barley, oats or combinations thereof. The cereal flour is mixed with flavoring syrup to form a mixture preferably having a moisture content of from about 22% to about 27%, although this particular moisture is not deemed to be critical from the standpoint of puffing a finished product. The mixture is then cooked according to any of the various cooking methods known to the art. The mixture may be cooked as is, or it may be pelletized in order to insure a more uniform cook. The cooking may, for example, be carried out in a closed pressure vessel at approximately 20 p.s.i.g. for from about 6 to about 30 minutes. Any alternations and modifications of known cooking processes are permissible.

After cooking, the mixture is preferably formed into pellets preparatory to case hardening and having a moisture content of from about 25% to about 28%, although it is possible to cook and form a dough pellet having higher as well as lower moistures, say broadly 18–45%, 25–28% being preferred from the standpoints of ease and practicality in achieving a case hardened pellet of 16–21% moisture, which latter moisture range is critical.

The pellets are then case hardened, for example, by blowing ambient air through the pellets for a period of several minutes, for example, from about 7 to about 10 minutes. On completion of this step, the pellets should have a moisture content of from about 16% to about 21%. If the pellets are dried to a moisture content below about 16% prior to puffing, the finished product will be hard and will not form puffs. If the pellets are dried to a moisture content above about 21%, the finished product will be overpuffed and in the form of very fragile hollow spheres. Case hardening the pellets according to the present invention produces a puffed product having improved appearance and texture relative to that produced by pellets not subjected to case hardening.

The case hardened pellets are then reduced in size by being passed through flaking rolls which reduce the pellets in size. The size of the flaking rolls is adjusted so that the reduced pellets are thicker than conventional corn flakes. Pellets which are the same thickness as conventional corn flakes cannot be puffed. In terms of the art, the pellets are "bumped" rather than flaked. The pellets are reduced in thickness and lengthened by the bumping operation. The extent to which the pellets are thinned and lengthened during bumping may be regulated by spacing the opening between the rollers. Thicker shorter pellets will form bigger but shorter puffs while thinner longer pellets will form smaller but longer puffs. The bumped pellets are then heated at temperatures of from about 350° F. to about 750° F. for from about 8 to about 35 seconds while being subjected to air at a velocity of at least about 500 feet per minute. This treatment causes the pellets to expand from about 150% to about 300% their original size. The moisture content of the cereal immediately after puffing is from about 3% to about 7%. Pellets which are subjected to temperatures below about 350° F. and air velocities below about 500 feet per minute tend to be underpuffed and hard. Temperatures above about 750° F. are undesirable because of the strong possibility of burning the product.

The puffed pellets are then toasted by conventional methods until a light, golden-brown color is obtained. Typical toasting conditions may, for example, employ temperatures of from about 225° F. to about 500° F. for from about 2 minutes to about 10 minutes.

It is to be understood that various modifiers and additives may be incorporated in the ready-to-eat puffed cereal product of the present invention. The nutritive value of these products may be enhanced by the addition of soy flour, milk protein, wheat gluten, wheat germ, etc. Other additives may be included, such as, for example, vitamins and minerals.

The following example illustrates the present invention without, however, limiting the same thereto.

EXAMPLE I 100 lbs. of corn flour was mixed with a flavoring syrup comprising 3.2 lbs. of sugar, 7.8 lbs. of malt syrup, 3.2 lbs. of salt and 23.4 lbs. of water to form a granular mixture having a moisture content of approximately 26%. The mixture was then cooked in a closed pressure vessel at approximately 20 p.s.i.g. for about 18 minutes. After being cooked, the mixture was air cooled and pelletized into cylindrical pellets having dimensions of approximately $7/64''$ x $9/64''$. The moisture content of the cooked pellets was between 25% and 28%.

The pellets were then case hardened by blowing ambient air therethrough for a period of 8–9 minutes. The case hardened pellets had a moisture content between 16% and 21%.

The case hardened pellets were then bumped through flaking rolls and placed immediately into a stream of air having a temperature of approximately 600° F. and an air velocity of about 1000 f.p.m. for 10 seconds. The puffed pellets were then toasted in an air convection dryer at temperatures ranging from 275–300° F. for 4 minutes. The final products was a light, golden-brown puffed corn product having a volume from 1.5 to 3 times that of the bumped pellets coming from the flaking rolls.

EXAMPLE II

Puffed oat flakes

Five pounds, eight ounces of pearled oat groat flour was blended with four pounds, six ounces rice flour and mixed with a flavoring syrup comprising eleven ounces malt syrup, five ounces sugar, five ounces lactose, four ounces salt, 0.8 grams monosodium glutamate, four milliliters imitation vanilla flavor and three pounds water to form a granular mixture. The mixture was then cooked in a closed pressure vessel at approximately 20 p.s.i.g. for twenty-eight minutes until the mixture was essentially completely cooked and the starch therein gelatinized. After cooking, the mixture was allowed to cool to ambient room temperature and thereafter pelletized into cylindrical pellets having dimensions of approximately 7/64" x 3/16". Moisture content of the cooked pellets was specifically 29.5%.

The pellets were then case hardened by blowing ambient room temperature air (75° F.) therethrough. The case hardened pellets had an average moisture content of 17.2%; the exterior of the pellets were hard whereas the interior was soft.

The case hardened pellets were then bumped through flaking rolls to flatten the pellets to a thickness of about 0.030" and placed immediately in a stream of air having a temperature of 400° F. and a linear air velocity of about 1000 f.p.m. for eight seconds. The puffed flake was typically ½" to 1" in length, about 1" wide and not over ½" thick; the flakes usually had the appearance of a large substantially unbroken sphere surrounded by a shewed girdle of smaller spheres. The puffed pellets were then oven toasted for thirteen seconds at 400° F. The final product was uniformly puffed, light in texture and had a rich toasted color.

EXAMPLE III

Puffed wheat flakes

Eight pounds of all-purpose wheat flour was blended with a flavoring syrup comprising .025 pound sucrose, .025 pounds salt, .0625 pound malt syrup, .02 pound lethicin and 1.875 pounds water to form a moist granular mixture having a moisture content of about 26%. The mixture was then cooked in a closed pressure vessel at approximately 20 p.s.i.g. for about twenty-two minutes. After cooking, the mixture was cooled with ambient room temperature air and pelletized into spherical pellets having a diameter of approximately 7/64".

The pellets were then case hardened by blowing ambient room temperature air through them for 7 minutes. The case hardened pellets had a moisture content of about 18%.

The case hardened pellets were then bumped through flaking rolls and placed immediately in a stream of air having a temperature in the range of 500–550° F. and a linear air velocity of 1000 f.p.m. for nine seconds. Except for being slightly darker in color, the puffed pellet had an appearance like that of the puffed oat flake of Example II. The puffed pellets were then oven toasted for 45 seconds at a temperature of 350° F. The final product was a light brown, puffed wheat cereal.

What is claimed is:

1. A process for preparing a ready-to-eat puffed cereal comprising case hardening moist cooked cereal pellets, the case hardened cereal pellets having a moisture content of from about 16% to about 21%, bumping the pellets to reduce their thickness and increase their length, puffing the pellets by heating them at temperatures from about 350° F. to about 750° F. while passing air therethrough at a velocity of at least 500 feet per minute for a period of time sufficient to cause said pellets to expand to at least about 150% their original size, and thereafter toasting the puffed pellets.

2. A process for preparing a ready-to-eat puffed cereal comprising case hardening cooked cereal pellets having a moisture content of from about 25% to about 28% by passing air therethrough, the case hardened pellets having a moisture content of from about 16% to about 21%, bumping the pellets to a size suitable for puffing, puffing the pellets by heating them at temperatures of from about 350° F. to about 750° F. while passing through the pellets air having a velocity of at least about 500 feet per minute for a period of time sufficient to cause said pellets to expand to at least about 150% their original size, and toasting the pellets by heating them at temperatures of from about 225° F. to about 500° F. for a time of from about 2 minutes to about 10 minutes.

References Cited

UNITED STATES PATENTS

| | | | |
|---|---|---|---|
| 1,945,946 | 2/1934 | McKay | 99—81 |
| 2,526,792 | 10/1950 | Alderman | 99—81 |
| 2,616,808 | 11/1952 | Roberts | 99—81 |
| 2,954,296 | 9/1960 | Clausi et al. | 99—82 |
| 3,190,755 | 6/1965 | Peden | 99—81 |
| 3,332,781 | 7/1967 | Benson | 99—81 |

FOREIGN PATENTS

| | | |
|---|---|---|
| 491,386 | 9/1938 | Great Britain. |

RAYMOND N. JONES, *Primary Examiner.*